UNITED STATES PATENT OFFICE.

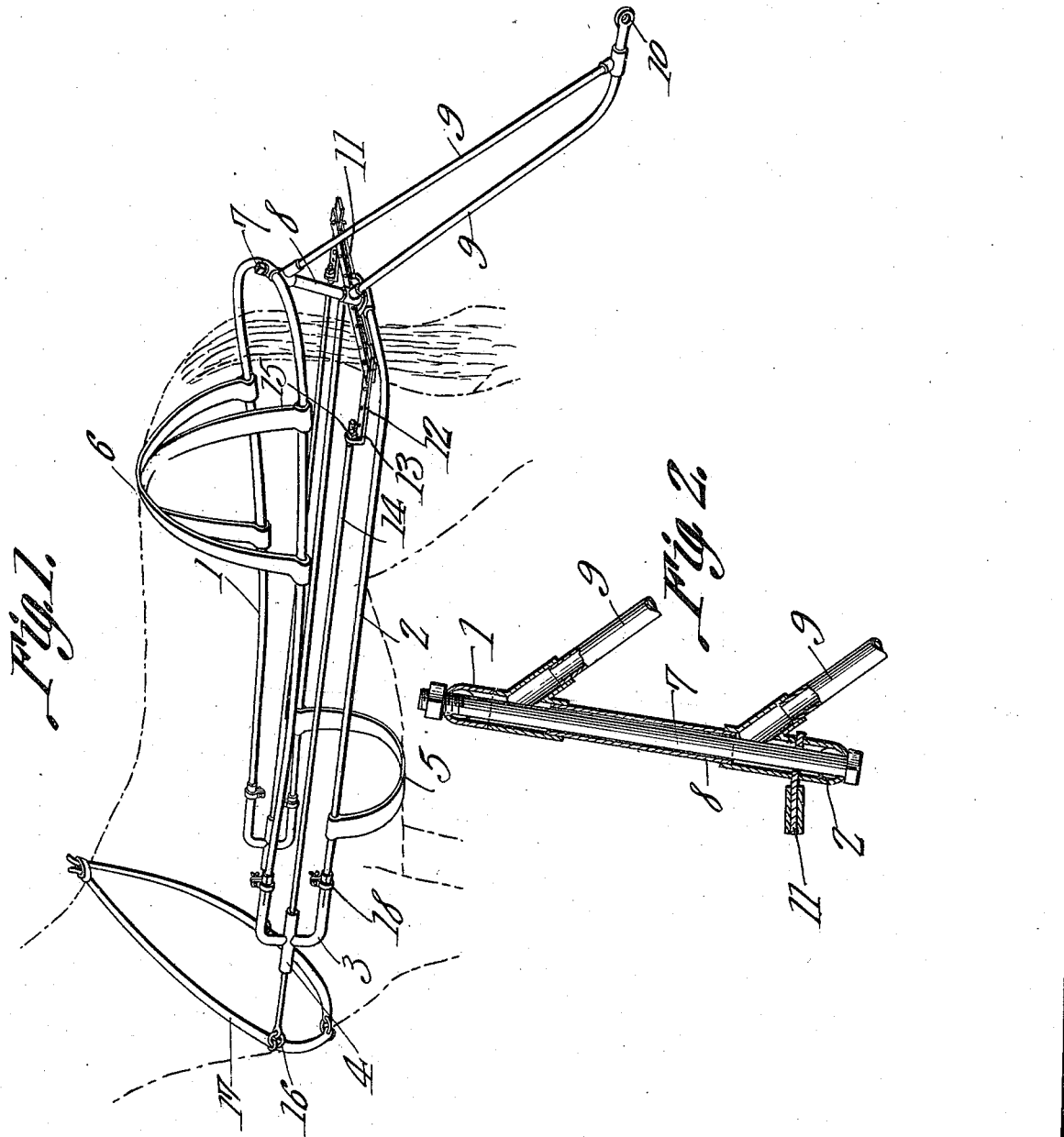

CHARLES A. RYAN, OF OROSI, CALIFORNIA.

PLOW-SHAFT.

976,303.  Specification of Letters Patent.  Patented Nov. 22, 1910.

Application filed June 27, 1910. Serial No. 569,107.

*To all whom it may concern:*

Be it known that I, CHARLES A. RYAN, a citizen of the United States, residing at Orosi, in the county of Tulare and State of California, have invented a new and useful Plow-Shaft, of which the following is a specification.

This invention relates to plow shafts and consists in the novel construction and arrangement of parts hereinafter shown, described and claimed.

The object of the invention is to provide a pair of shafts which simulate a harness and are adapted to be applied to the body of a draft animal in such manner that the limbs of the animal are free to move and the draft strain may be transmitted from the body of the animal to the attached plow without bearing down upon the body.

With this object in view the invention includes upper and lower shaft members with adjustable guide members connecting their forward ends together. A tail piece is pivoted to the rear portions of the shaft members. The said tail piece is free to swing approximately horizontal and a swingle tree is pivoted at the rear portion of the said shaft members. The rear ends of traces are adjustably connected with the ends of the swingle tree and the forward portions of the said traces pass through the said guide members. The forward ends of the said traces are adapted to be connected with the hames of the harness by means of links.

In the accompanying drawings Figure 1 is a perspective view of the plow shafts. Fig. 2 is a sectional view of the rear portion of the shaft members and adjacent parts.

The plow shaft includes an upper shaft member 1 and a lower shaft member 2. The said shaft members are approximately U-shaped in plan and are adapted to pass around the hips of a draft animal. The forward ends of the shaft members 1 and 2 are connected together by guide members 3 which are provided with sleeves 4. A girth 5 is connected at its ends to the opposite side portions of the shaft member 2 and is adapted to pass under the body of the draft animal in the usual manner. Hip straps 6 are connected at their ends to the rear portion of the member 1 and are adapted to pass over the hips of the draft animal. At their rear ends the upper and lower shaft members 1 and 2 are connected together by means of a rod 7. A tube 8 is pivoted upon the intermediate portion of the rod 7 and is located between the shaft members 1 and 2. Draft bars 9 are connected at their forward ends to the upper and lower portions respectively of the tube 8 and at their rear ends the draft bars are connected together and are provided with an eye 10 which may be secured to the clevis of a plow in any suitable manner.

A swingle tree 11 is pivotally mounted at a point intermediate its ends upon the lower portion of the rod 7 and links 12 are pivotally and adjustably mounted at the end portions of the said swingle tree 11. Eyes 13 are formed upon the links 12 and the rear ends of traces 14 pass through said eyes and are secured therein by means of nuts 15 screw threaded upon the rear extremities of the said traces. The forward portions of the traces 14 pass through the sleeve 4 and links 16 are connected with the forward ends of the said traces and are adapted to be connected with hames (indicated at 17) in any suitable manner. The guide members 3 are preferably formed from tubing having split ends and telescopically receive the forward ends of the shaft members 1 and 2. Clamps 18 may be provided for contracting the split ends of the members 3 whereby the said members may be secured in any adjusted position upon the members 1 and 2. Any other suitable device may be employed for adjustably securing the member 3 upon the members 1 and 2.

The tube 8 and the draft bar 9 together with the eye 10 constitute the tail piece of the plow shafts and inasmuch as the said tube is journaled upon the intermediate portion of the rod 7 the said tail piece is free to swing approximately horizontally at the rear ends of the bars 9.

By reason of the fact that the links 12 are adjustably mounted upon the swingle tree 11 and the rear ends of the traces 14 are adjustably connected with the eyes 13 the said traces 14 may be adjusted longitudinally with relation to the swingle tree 11 in order to adapt the device to animals of long or short bodies. Also the guide members 3 may be adjusted upon the members 1 and 2 to properly support the forward portions of the traces 14.

By reason of the fact that the swingle tree 11 is pivotally mounted and is connected in the manner as indicated with the hames 17 of the harness the said tree is free to swing upon its pivot as the animal alternately advances its shoulders when walking. At the same time the draft strain is transmitted from the hames 17 in a direct manner to the swingle tree 11 and from the said tree through the tail piece to the plow.

Again by reason of the fact that the draft bars 9 slant in a downward direction toward their rear ends and the eye 10 is considerably lower than the point of connection between the forward ends of the traces 14 and the hames 17; when the draft animal is tugging the draft strain will endeavor to seek the shortest line between the point of connection of the traces 14 of the harness and the eye 10 and inasmuch as the load is attached to the eye 10 there will be a tendency to elevate the rear portion of the shafts 1 and 2 which will lift the hip straps 6 above the hips of the animal and therefore there will be no bearing down strain or weight upon the animal's hind legs. The function of the hip straps 6 is merely to sustain the weight of the rear portions of the shaft members 1 and 2 when there is no considerable load or weight attached to the eye 10.

In view of the fact that the tail piece is pivotally connected with the rear portions of the shaft members 1 and 2 the plow which is attached to the eye 10 may be readily swung to one side or the other in order to be guided along the row. The shaft members 1 and 2 as well as the sleeve 8 and bars 9 are preferably made from tubing or piping while the traces 14 may be formed from rods or metallic cables as desired.

Having described the invention what I claim as new and desire to secure by Letters Patent is:—

1. A plow draft appliance comprising shafts, a tail piece pivoted to the shafts and adapted to be connected with a plow beam, a swingle-tree pivotally connected with the shafts and traces connected at their rear ends with the swingle-tree and guided at their forward portions with relation to the shafts.

2. A draft appliance comprising shafts, a girth connected with the forward portions of the shafts, a hip strap connected with the rear portions of the shafts, a tail piece pivotally connected with the rear portions of the shaft, a swingle-tree pivotally connected with the rear portions of the shafts, and traces connected at their rear ends to the end portions of the swingle-tree and guided at their forward portions with relation to the shafts.

3. A draft appliance comprising shafts composed of upper and lower spaced members, a tail piece pivotally connected with the rear portions of the shafts, a swingle-tree pivotally connected with the shafts and traces connected at their rear ends to the end portions of the swingle-tree and guided at their forward portions with relation to the shafts.

4. A draft appliance comprising shafts, a tail piece pivotally connected to the rear portions of the shafts, a swingle-tree pivotally connected with the rear portions of the shafts, links pivoted to the ends of the swingle-tree, traces adjustably connected at their rear ends with the links and guided at their forward portions with relation to the shafts.

5. A draft appliance comprising shafts composed of upper and lower shaft members connected together at their forward ends, a tail piece pivotally connected with the rear portions of the shaft members and located at its forward end between the same, a swingle-tree pivotally connected with the rear portions of the shaft members, links pivoted upon the end portions of the swingle-tree, and traces connected at their rear ends with the links and guided at their forward portions with relation to the shafts.

6. A draft appliance consisting of shafts composed of upper and lower shaft members spaced from each other, members connecting the forward ends of said shaft members together and carrying guides, a tail piece pivotally connected at its forward end with the shaft members on a line between the same, a swingle-tree pivotally connected with the rear portions of the shaft members, links pivotally mounted on the ends of the swingle-tree, traces adjustably connected at their rear ends to the said links and passing through the guides provided at the members which connect the forward ends of the shaft members together.

In testimony that I claim the foregoing as my own, I have hereto affixed my signature in the presence of two witnesses.

CHARLES A. RYAN.

Witnesses:
F. M. COOK,
FRED HOPSON.